(12) United States Patent
Spishock et al.

(10) Patent No.: US 9,774,176 B1
(45) Date of Patent: Sep. 26, 2017

(54) METHOD AND APPARATUS FOR PROTECTION OF WIRING FREE ENDS AND CONNECTORS

(71) Applicant: The Boeing Company, Chicago, IL (US)

(72) Inventors: Karl M Spishock, Summerville, SC (US); Laura J. Corvi, Seattle, WA (US); Maegahn R. Steele, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 508 days.

(21) Appl. No.: 13/842,477

(22) Filed: Mar. 15, 2013

(51) Int. Cl.
  *H02G 1/00* (2006.01)
  *H02G 3/04* (2006.01)

(52) U.S. Cl.
  CPC ................. *H02G 3/04* (2013.01); *H02G 1/00* (2013.01)

(58) Field of Classification Search
  CPC H02G 3/04; H02G 1/00; H02G 15/18; H02G 15/1813; H02G 1/14
  See application file for complete search history.

(56) References Cited

U.S. PATENT DOCUMENTS

| | | | | |
|---|---|---|---|---|
| 2,883,813 | A | * | 4/1959 | Shannon ................. B65B 27/10 29/33 P |
| 3,209,061 | A | * | 9/1965 | Mier et al. .................... 174/5 R |
| 4,018,983 | A | * | 4/1977 | Pedlow ........................ 174/135 |
| 4,059,322 | A | | 11/1977 | Fellner |
| 4,939,778 | A | * | 7/1990 | Tomberlin .................... 379/438 |
| 5,273,454 | A | * | 12/1993 | Shotey .......................... 439/367 |
| 5,403,977 | A | * | 4/1995 | Steptoe et al. .............. 174/77 R |
| 5,753,861 | A | * | 5/1998 | Hansen et al. .................. 174/93 |
| 6,160,222 | A | * | 12/2000 | Claverie ......................... 174/93 |
| 6,874,541 | B2 | | 4/2005 | Vossen |
| 7,895,716 | B2 | * | 3/2011 | Taillon et al. ................ 24/16 R |
| 2002/0098311 | A1 | * | 7/2002 | Lindner ....................... 428/40.1 |
| 2003/0141976 | A1 | * | 7/2003 | Dickinson et al. ........ 340/572.8 |
| 2006/0025010 | A1 | * | 2/2006 | Spitaels et al. ............... 439/532 |
| 2006/0110117 | A1 | * | 5/2006 | Denovich et al. ............ 385/135 |
| 2012/0289145 | A1 | | 11/2012 | Kerlinger, Jr. |

* cited by examiner

*Primary Examiner* — Valentina Xavier
(74) *Attorney, Agent, or Firm* — Parsons Behle & Latimer (57) ABSTRACT

An unassembled aircraft segment that has a plurality of wire bundles is disclosed herein. Each of the plurality of wire bundles comprises at least one of (a) a free end, and (b) a connector. The unassembled aircraft segment also has a plurality of wire bundle protectors each having a fire retardant material, an outer surface, an inner surface configured to define an interior portion, a self-securing opening configured to provide access to the interior portion, and at least one tie connected to the outer surface and configured to secure each of the plurality of wire bundle protectors to a structure of the unassembled aircraft segment. Each of the plurality of wire bundle protectors is installed on each free end and each connector of the plurality of wire bundles.

20 Claims, 10 Drawing Sheets

METHOD AND APPARATUS FOR PROTECTION OF WIRING FREE ENDS AND CONNECTORS

BACKGROUND

The present application relates generally to the field of wire protection and more specifically to protecting free ends and connectors of wire bundles.

During the fabrication of a variety of structures, apparatuses, and vehicles, wiring may be run through segments of the respective structures, apparatuses, and vehicles prior to assembling all of the segments into a finished product. For instance, pre-fabricated buildings may comprise a plurality of wall, floor, roof, and ceiling segments in which wiring may be run prior to assembling all of the segments to form a fully assembled building. Alternatively, segments of a vehicle may be prepared, and wire run through each respective segment, prior to transport and/or final assembly of the vehicle segments. It may be advantageous, for example, to prepare different segments of a structure, apparatus, or vehicle in different places, and then bring the different segments together for assembly at a final destination. However, transporting unassembled segments of a structure, apparatus, or vehicle may put stress on the wiring and wiring connectors. For example, wiring and wiring connectors may experience abrasion and chafing during transport. Additionally, debris, dirt, dust, and moisture, among other things, may be introduced into the wiring system during and/or prior to final assembly.

Typically, protection of the wiring and wiring connections in the structure, apparatus, and vehicle segments discussed above may be performed by applying a protective material, such as a bubble wrap, to the wiring and wiring connections, and securing the protective material by means of a securing strap or zip tie. In some cases, the application and removal of protective material may introduce significant amounts of material, labor and time expenditures. Additionally, the removal process may require heightened attention and care to avoid damaging wires and wire connectors. Furthermore, it may be difficult to recapture the protective material for reuse.

Outgassing refers to the release of gases that may have been trapped or may otherwise exist in a material. Outgassing occurs naturally at different rates. Different gases are released at different altitudes and temperatures. Normally, the released gasses escape unnoticed into the environment, however, they may be a cause for concern when they are trapped in a closed environment. For instance, NASA and others have concluded, based on the results of various studies, that outgassing from plastic materials may be detrimental to the performance of electrical contacts and electrical connectors. Furthermore, outgassing may cause fogging of optical contacts in optical fiber systems.

There is a need for a method and apparatus for protecting wiring and wiring connectors from chafing, abrasion, and the introduction of dirt, debris, and moisture during fabrication and transport. There is a need to protect wiring and wiring connectors against outgassing during fabrication and transport. It would be preferable to reduce labor and resources spent preparing wiring and wiring connectors during fabrication and for transport. Additionally, it would be preferable to reuse protection material used to protect wiring and wiring connections.

SUMMARY

An unassembled aircraft segment that has a plurality of wire bundles is disclosed herein. Each of the plurality of wire bundles comprises at least one of (a) a free end, and (b) a connector. The unassembled aircraft segment also has a plurality of wire bundle protectors each having a fire retardant material, an outer surface, an inner surface configured to define an interior portion, a self-securing opening configured to provide access to the interior portion, and at least one tie connected to the outer surface and configured to secure each of the plurality of wire bundle protectors to a structure of the unassembled aircraft segment. Each of the plurality of wire bundle protectors is installed on each free end and each connector of the plurality of wire bundles.

A method of protecting wire bundle free ends and wire connectors during fabrication, transport, delivery, and final assembly of an apparatus is also disclosed herein. The method comprises providing a wire bundle protector of a fire retardant material. The wire bundle protector has an outer surface connected to at least one tie, an inner surface configured to define an interior portion, and a self-securing opening configured to provide access to the interior portion. The method also comprises expanding the self-securing opening of the wire bundle protector, and inserting at least one of (a) a free end of a wire bundle or (b) a connector of a wire bundle into the self-securing opening. An additional method step includes securing the wire bundle protector to a structure in proximity of the wire bundle protector via the at least one tie.

A protector is also disclosed herein. The protector has a fire retardant material, an outer surface connected to at least one tie configured to secure the protector to a structure, an inner surface configured to provide an interior of the protector, and a self-securing opening configured to provide access to the interior of the protector.

The preceding examples are not intended to be interpreted in a restrictive sense. Indeed, the preceding system and apparatus examples are provided to illustrate possible examples of a system or apparatus comprising wire bundle protectors that may be used on aircraft, ships, pre-fabricated homes, and any other structure that has segments with wiring and wire connectors run therein prior to final assembly. The preceding method example is provided to illustrate a method of attaching a wire bundle protector to a wire bundle comprising a free end and/or a connector, and is not intended to be interpreted in a restrictive sense. Indeed, none of the examples listed in the current disclosure are intended to limit the interpretation of the relevant claim terms.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific examples in which the disclosure may be practiced. These examples are described in sufficient detail to enable those skilled in the art to practice the disclosure, and it is to be understood that other examples may be utilized and that various changes may be made without departing from the spirit and scope of the present disclosure. The following detailed description is, therefore, not to be taken in a limiting sense.

Figure 1:
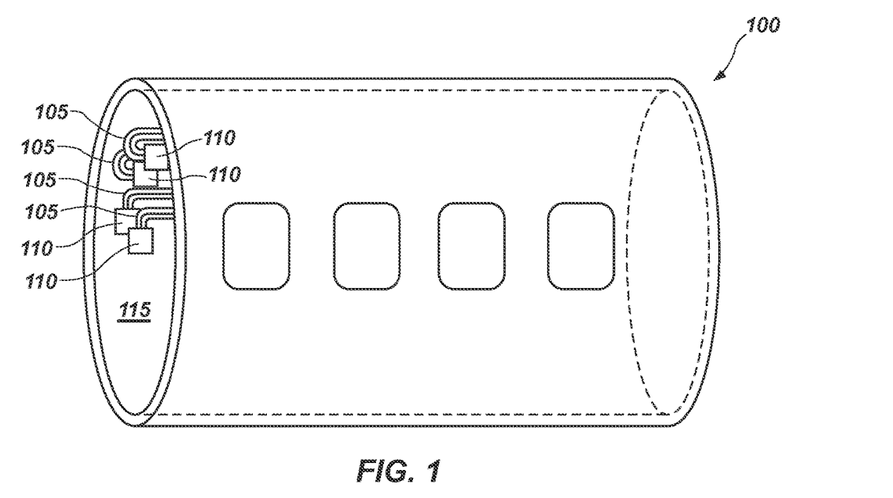
FIG. 1 illustrates an unassembled aircraft segment.

FIG. 1 is a perspective view of an unassembled aircraft segment 100 comprising a plurality of wire bundles 105, and a plurality of wire bundle protectors 110. Unassembled aircraft segment 100 may have an interior 115 comprising, for instance, an airframe or other structural members. The plurality of wire bundles 105 may run along interior 115 of unassembled aircraft segment 100, and may have a free end and/or a connector.

As illustrated in FIG. 1, unassembled aircraft segment 100 is represented by a portion of an aircraft fuselage. However, as used herein, an unassembled aircraft segment 100 may be any portion or subassembly of an aircraft, including a segment of a fuselage, a segment of a wing assembly, or a segment of a tail assembly, among other things, wherein wire bundles 105 may be installed prior to final assembly of a plurality of different aircraft segments, referred to herein as the wire installation process. For instance, in one example, an aircraft may comprise a plurality of unassembled aircraft segments 100 that are prepared and transported separately, and thereafter joined and assembled to form an aircraft. In this example, a factory tasked with preparing fuselage segments of an aircraft may prepare a segment of the fuselage, may run a plurality of wire bundles 105 throughout the unassembled aircraft segment 100 in the wire installation process, and may then transport the unassembled aircraft segment 100 to a different part of the factory, a different state, or even a different country or continent for final assembly. A plurality of wire bundle protectors 110 may be installed on the plurality of wire bundles 105 during or after the wire installation process. The final assembly of an aircraft may comprise the reception of a plurality of unassembled aircraft segments 100, arranging and connecting the plurality of unassembled aircraft segments 100, exposing the free ends and/or connectors of the plurality of wire bundles 105, and attaching the free ends and/or connectors of the plurality of wire bundles 105 of one unassembled aircraft segment 100 to a plurality of wire bundles 105 of a second unassembled aircraft segment 100.

Wire bundles 105 may comprise any suitable type of cable. For instance, wire bundles 105 may comprise ribbon, coaxial, copper, multicore, twisted pair, and optical fiber cabling, among other things. Likewise, connectors of the plurality of wire bundles 105, such as, for example, connector 345 (FIG. 3D) may comprise any suitable type of connectors. For instance, if wire bundles 105 comprise copper-based wires, suitable connectors may comprise electrical wire connectors. If wire bundles 105 comprise fiber optic wires, suitable connectors may comprise fiber optic wire connectors. As is to be understood, wire bundles 105 may comprise any suitable form of connector or harness.

Figure 2A:
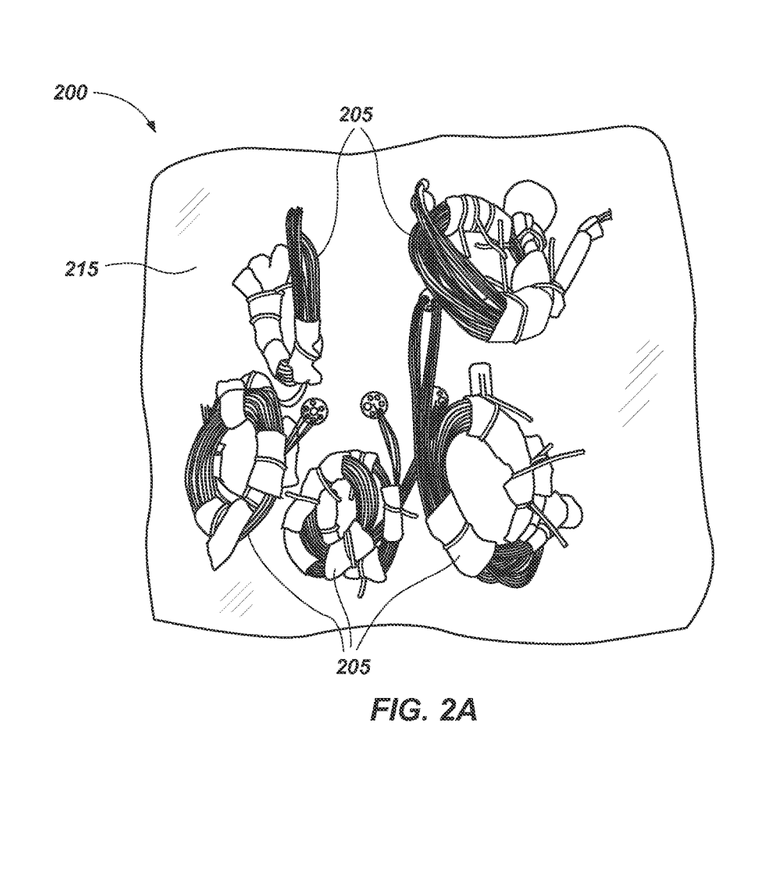
FIGS. 2A and 2B illustrate a plurality of wire bundles in an unassembled aircraft segment, and an exemplary use of wire bundle protectors.
Figure 2B:
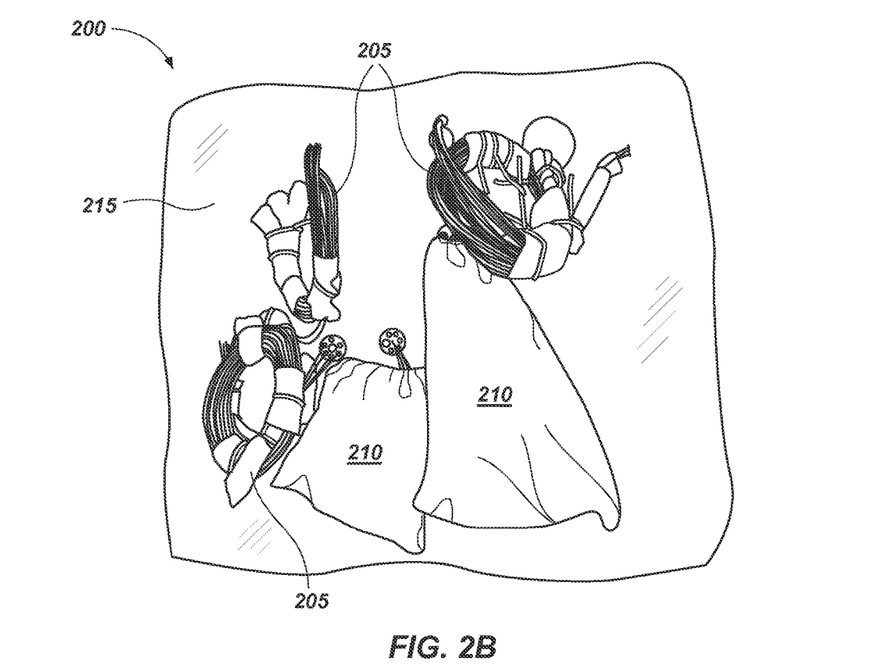
Figure 4A:
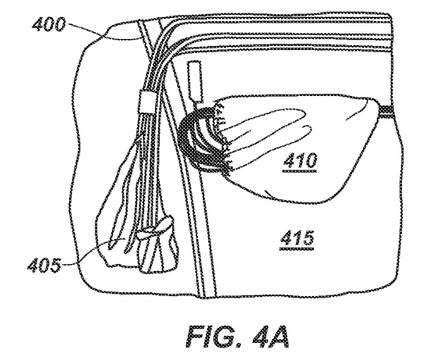
FIGS. 4A-4C illustrate other exemplary uses of wire bundle protectors.

FIG. 2A illustrates an interior 215 of an unassembled aircraft segment 200 comprising a plurality of wire bundles 205. During the fabrication of unassembled aircraft segment 200, wire bundles 205 may be wrapped, arranged, and/or otherwise prepared for transport and delivery. The typical method of preparing wire bundles and connectors during assembly, and for transport and delivery, as illustrated in FIG. 2A, may comprise wrapping wire bundles 205 in protective wrap and securing the protective wrap with zip ties. In one example, wire bundles 205 may be wrapped in protective material, such as a fire retardant plastic sheet or cushioned wrapping material, such as encapsulated air packaging or air bubble packaging like bubble wrap, or some gel-based packaging material, or some other fire retardant material. As used herein, a fire retardant material refers to any material configured to slow and/or check the spread of fire. For purposes of this disclosure, fire resistant and fire proof materials are considered to be fire retardant. Wire bundles 205 may be secured using zip ties or any other suitable securing mechanism including, but not limited to, clips, clamps, and harnesses. Wire bundles 205 may be arranged in coils, as shown in FIGS. 2A and 2B. Alternatively, wire bundles 205 may be arranged to hang freely, as shown in FIG. 4A. Wire bundle protector 210 may be configured to secure wire bundle 205 independent of the specific arrangement thereof, including whether wire bundles 205 are coiled or hang freely, among other things.

As seen in FIG. 2B, wire bundles 205 may be secured in wire bundle protectors 210. Wire bundle protectors 210 may comprise a fire retardant material and a self-securing opening in order to facilitate the securing and transport of unassembled aircraft segment 200 and wire bundles 205. Suitable materials may include fire retardant plastics, vinyls, elastics, threads, and fabrics, among other things. In another example, wire bundle protectors 210 may comprise a material that is both fire retardant and anti-static. For instance, wire bundle protectors 210 may comprise thread, an elastic, and a polyethylene material that are both fire retardant and anti-static. In this example, suitable materials may comprise: (1) a fire retardant cushioned wrapping material such as a encapsulated air packaging; (2) a fire retardant thread with fire and/or flame retardant properties including, but not limited to, para-aramid fibers of which Nomex® 30/3 Tex 60 spun thread manufactured by DuPont is one possible suitable thread; (3) a fire retardant elastic material comprising fibers of with fire and flame retardant properties such as blends of polybenzimidazole (PBI) and/or para-aramid fibers such as Kevlar® and Nomex®, wherein one possible suitable flame retardant elastic element is style 5250 manufactured by Rhode Island Textiles; and (4) a fire retardant polyethylene such as 6 mil anti-static fire retardant ASFR6 manufactured by Americover or fire retardant 3-ply T55FR manufactured by Reef Industries, among other things. Of course, any other suitable material that is fire retardant is contemplated under the present disclosure.

In use, wire bundle protectors 210 may be placed over wire bundles 205 and may be secured to a structure of unassembled aircraft segment 200, such as an airframe member, among other things, or equipment of unassembled aircraft segment 200, such as a speaker, among other things. For instance, during fabrication, wire bundles 205 may be installed into unassembled aircraft segment 200 and wire bundle protectors 210 may be installed on wire bundles 205. In another example, wire bundle protectors 210 may be installed on wire bundles 205 prior to transport and delivery of unassembled aircraft segment 200. Wire bundle protectors 210 may be attached to a structure of unassembled aircraft segment 200 to protect wire bundles during the transport and delivery process. For instance, if wire bundles 205 run in a ceiling portion of unassembled aircraft segment 200, wire bundle protectors 210 may be attached to a structure in the ceiling and may be configured to relieve pressure and stress on wire bundles 205 and any fasteners holding wire bundles 205 in place, among other things. In another example, if wire bundles 205 run in a sidewall of an unassembled aircraft segment 200, wire bundle protectors 210 may be attached to a structure in the sidewall of unassembled aircraft segment 200.

Figure 3A:
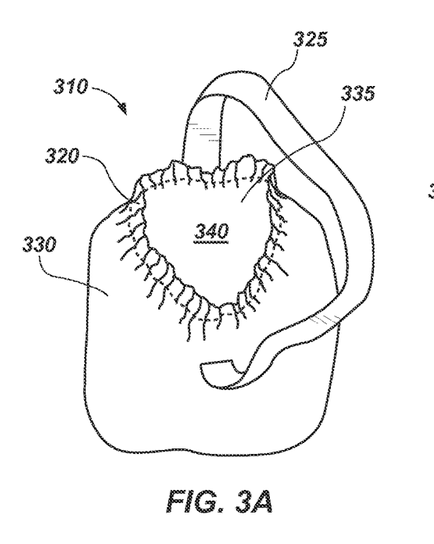
FIGS. 3A-3G illustrate different examples of wire bundle protectors.
Figure 3B:
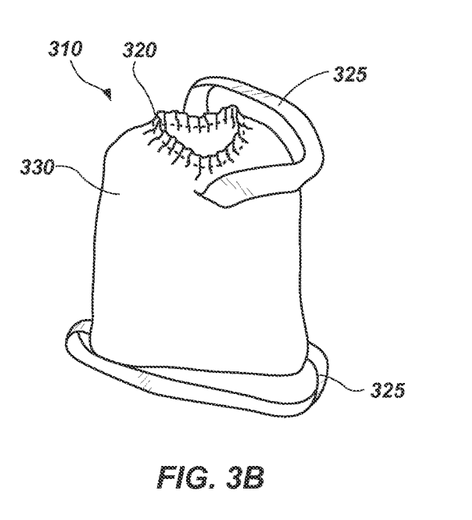

FIGS. 3A and 3B are two side views of one example of a wire bundle protector 310. In this example, wire bundle protector 310 may comprise a self-securing opening 320, at least one tie 325, an outer surface 330, an inner surface 335, and an interior 340. As discussed above, wire bundle protector 310 may comprise a fire retardant material. Additionally, wire bundle protector 310 may comprise an anti-static material. Tie 325 could be any suitable means or mechanism configured to attach, or to facilitate the attachment of, wire bundle protector 310 to a structure of unassembled aircraft segment 100. For instance, tie 325 could be a strap, clasp, hook, or fastener, among other things.

Additionally, in one example, the material of wire bundle protectors 310 may be configured to be flexible and large enough to allow air to circulate within the interior 340 of wire bundle protectors 310. For example, self-securing opening 320 may be configured to secure around wire bundles 305 while nevertheless allowing air to flow into and out of wire bundle protector 310.

Wire bundle protector 310 may also be configured to be reusable. For instance, wire bundle protector 310 may comprise materials suitable for repeated use. Wire bundle protector 310 may be attached to a wire bundle 305 for transport and delivery, may be unattached prior to final assembly, and the wire bundle protector 310 may be reused.

Figure 3C:
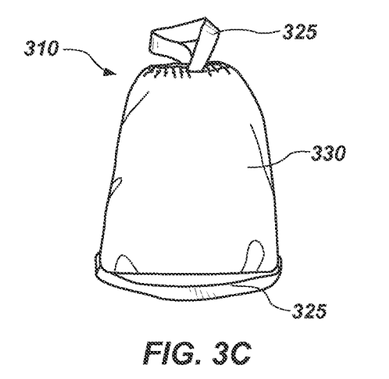
Figure 3D:
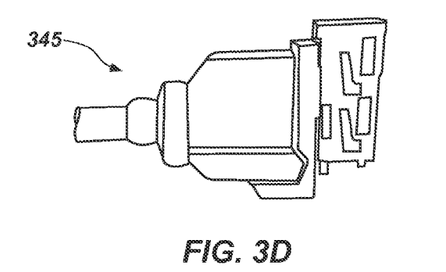
Figure 3E:
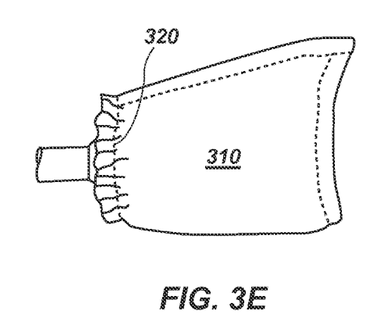
Figure 3F:
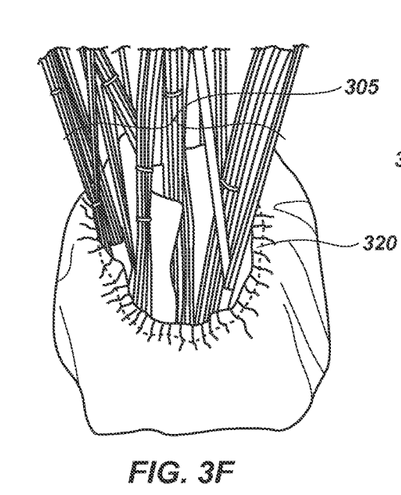
Figure 3G:
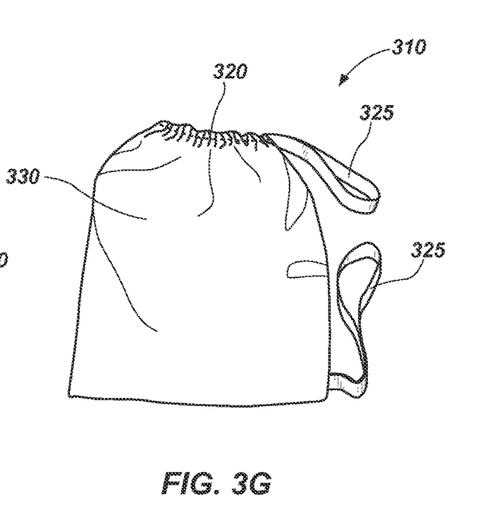

In one example, tie 325 comprises the same fire retardant material as wire bundle protector 310. In another example, tie 325 may comprise a different material as compared to wire bundle protector 310. As illustrated in FIGS. 3C and 3F, wire bundle protector 310 may comprise a plurality of ties 325. For instance, a tie 325 may be provided in relation to both a top portion and a bottom portion of wire bundle protector 310. Tie 325 may be configured and arranged in order to secure wire bundle protector 310 and wire bundles 305 in a desired position and arrangement. For instance, as illustrated in FIG. 3G, wire bundle protector 310 may comprise two ties 325 both arranged along a seam of outer surface 330. In another example, tie 325 may be offset such as, for instance, including one tie 325 on one surface and a second tie 325 on an opposite surface.

Tie 325 may be attached to outer surface 330 using any suitable process or mechanism. For instance, tie 325 may be sewn into the material of wire bundle protector 310. In another example, tie 325 may be attached using a heat sealing process or mechanism. Tie 325 may also be attached using an epoxy or other fixing substance, such as a tape. Additionally, tie 325 may be arranged in a reinforced example configured to provide additional support and strength to wire bundle protector 310 in cases of heavier loads. Of course, the preceding examples are merely illustrative and are not intended to encompass the entire universe of processes and mechanisms for securing tie 325 to wire bundle protector 310.

In one example, self-securing opening 320 may comprise an elastic element configured to secure wire bundle protector 310 on wire bundles 305. The elastic element may be affixed to wire bundle protector 310 via epoxy, stitching, or any other suitable affixing means or mechanism. For instance, the elastic element may be stitched into wire bundle protector 310. Alternatively, an elastic epoxy may be employed to secure the elastic element into the interior surface 340 of wire bundle protector 310. In yet another example, a portion of wire bundle protector 310 may be folded down and secured around an elastic element to form an enclosure around the elastic element. Other examples of wire bundle protector 310 may comprise any other suitable materials to secure wire bundles 305 in interior 340 of wire bundle protector 310, such as fire retardant drawstrings, velcro, and straps, among other things.

In another example, wire bundle protector 310 may be configured to secure and otherwise protect a connector 345 of a wire bundle 305. For instance, wire bundle protector 310 may comprise a fire retardant bubble wrap material and be configured to include a self-securing opening 320 (see FIGS. 3D and 3E). In one example, a wire bundle protector 310 configured to protect a connector 345 may also comprise tie 325. In another example, a first wire bundle protector 310 may comprise at least one additional wire bundle protector 310 integrated and/or arranged within the first wire bundle protector 310, wherein the at least one additional wire bundle protector 310 may be configured to protect a connector 345. An example of wire bundle protector 310 configured to protect a connector 345 may comprise any suitable fire retardant and/or anti-static material configured to provide protection to connector 345 against abrasion and chafing, among other things. For instance, suitable materials may comprise fire retardant bubble wrap, cushions, and pads, among other things.

Additionally, wire bundle protector 310 may be repairable. For instance, wire bundle protector 310 may rip or tear during use, and it may be necessary to patch excessive wear, or any rips or tears in order to continue using or reusing wire bundle protector 310. In one example, wire bundle protector 310 may be repaired using repair tape, glue, epoxy, or any other suitable process or mechanism. If wire bundle protector 310 comprises a polyethylene material, then a suitable repair mechanism may be a suitable polyethylene repair tape, such as, for example, POLYKEN-225FR. Other repair mechanisms and processes are likewise contemplated by the present disclosure. Additionally, the principle disclosed herein may be used in order to reinforce wire bundle protector 310. For instance, in one example a polyethylene repair tape may be used to reinforce ties 325.

Figure 4B:
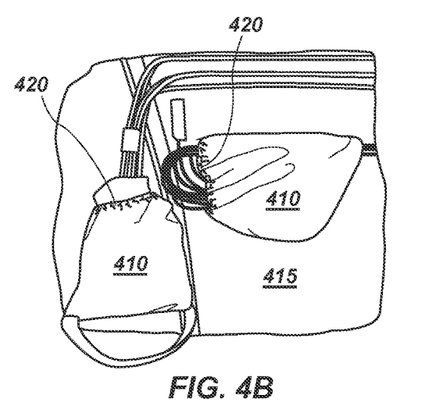
Figure 4C:
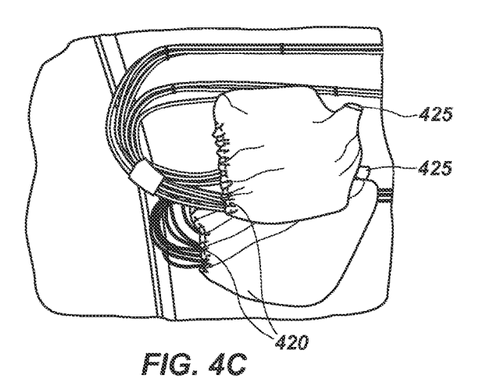

FIGS. 4A-4C illustrates installation of wire bundle protectors 410 on wire bundles 405 and securing wire bundle protectors 410 to a structure of an unassembled aircraft segment 400. As shown in FIG. 4A, a wire bundle 405 may be installed in an interior 415 of an unassembled aircraft segment 400. For instance, wire bundle 405 may comprise at least one free end and/or connector to be protected during fabrication, transport and delivery, and up until final assembly. A wire bundle protector 410 may be installed over wire bundle 405 as shown in FIG. 4B. In one example, the installation of wire bundle protector 410 onto a wire bundle 405 may be performed by one mechanic, technician, or other worker (collectively referred to as "mechanic" herein). As shown in FIG. 4C, wire bundle protector 410 may also be attached to a structure, such as a hook, latch, fastener, or other structural member of unassembled aircraft segment 400. In one example, wire bundles 405 may be arranged in a sidewall of an unassembled aircraft segment 400. In this example, and other related examples, the installation of wire bundle protectors 410 is consistent with the foregoing description.

As discussed above and illustrated in FIGS. 5A-5D, wire bundle protector 510 may be implemented in a variety of examples in order to protect wire bundles 505 running through a ceiling portion of an interior 515 of an unassembled aircraft segment 500. For instance, wire bundle protector 510 may comprise tie 525 and be configured to attach to a structure of interior 515 of an unassembled aircraft segment 500. In one example, wire bundle protector 510 may be configured to have a width and a depth, wherein the depth is at least twice the width. In another example, wire bundle protector 510 may be configured to have a width substantially equal to, or greater than, a depth.

Figure 5A:
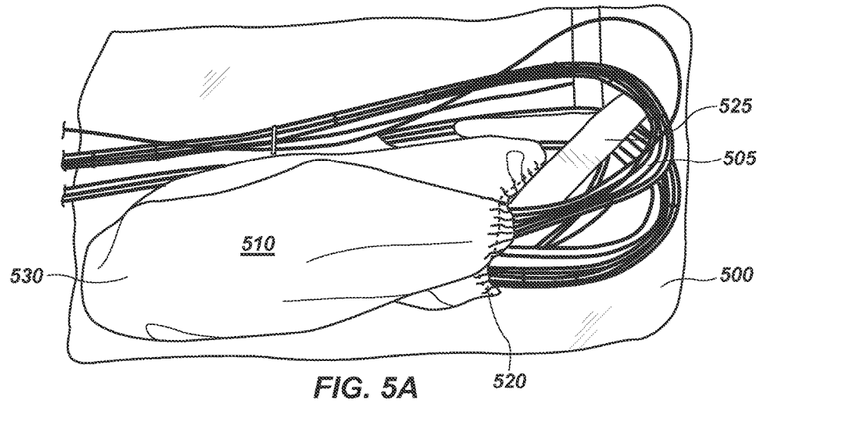
FIGS. 5A-5G illustrate wire bundle protectors and a plurality of uses thereof.
Figure 5B:
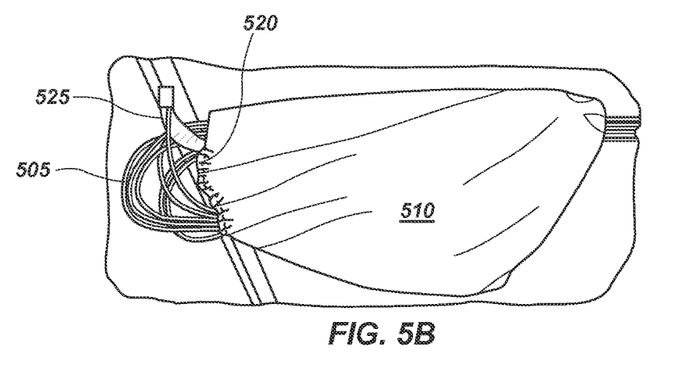
Figure 5C:
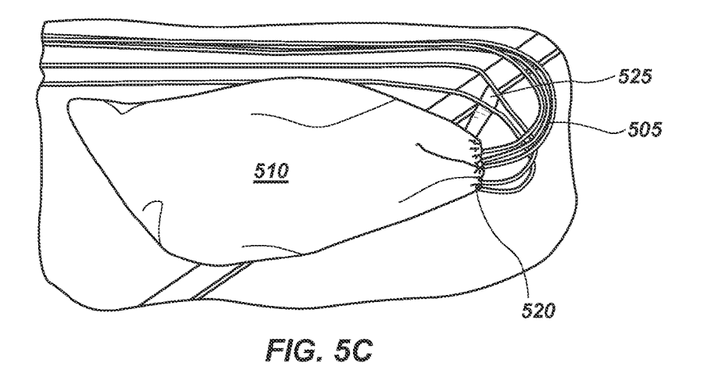
Figure 5D:
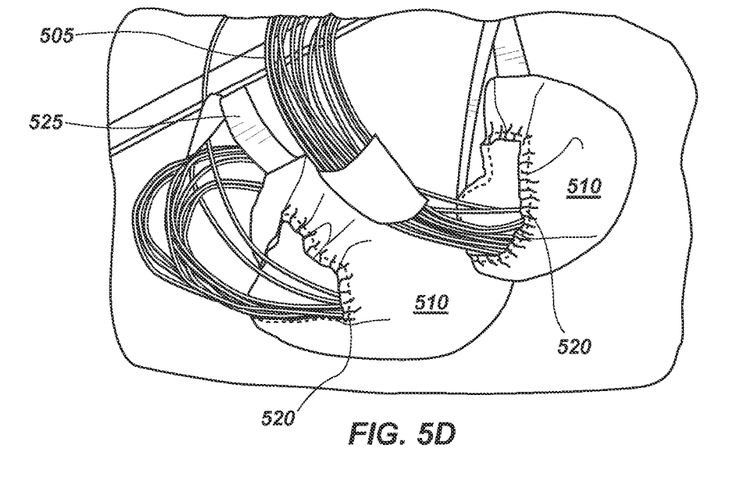
Figure 5E:
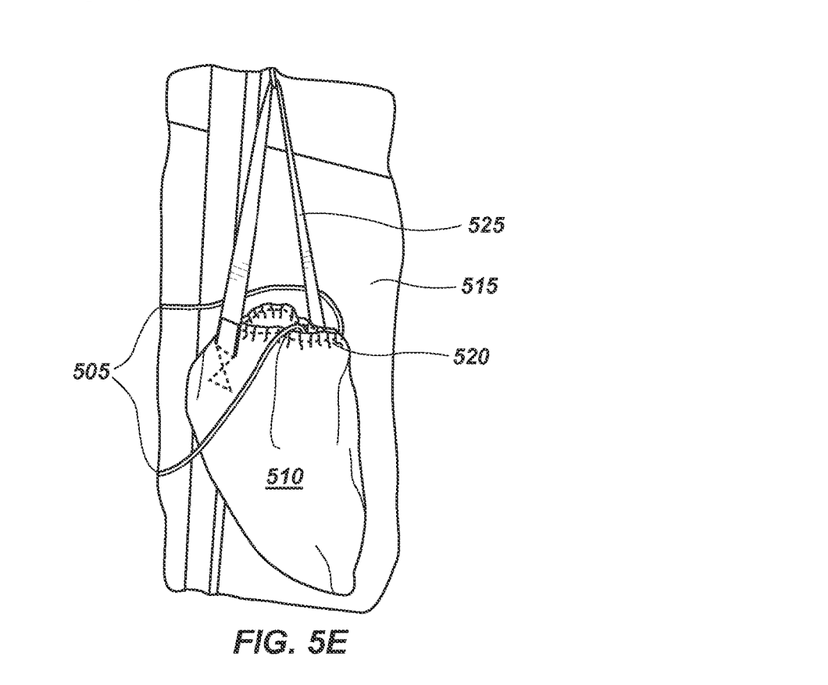
Figure 5F:
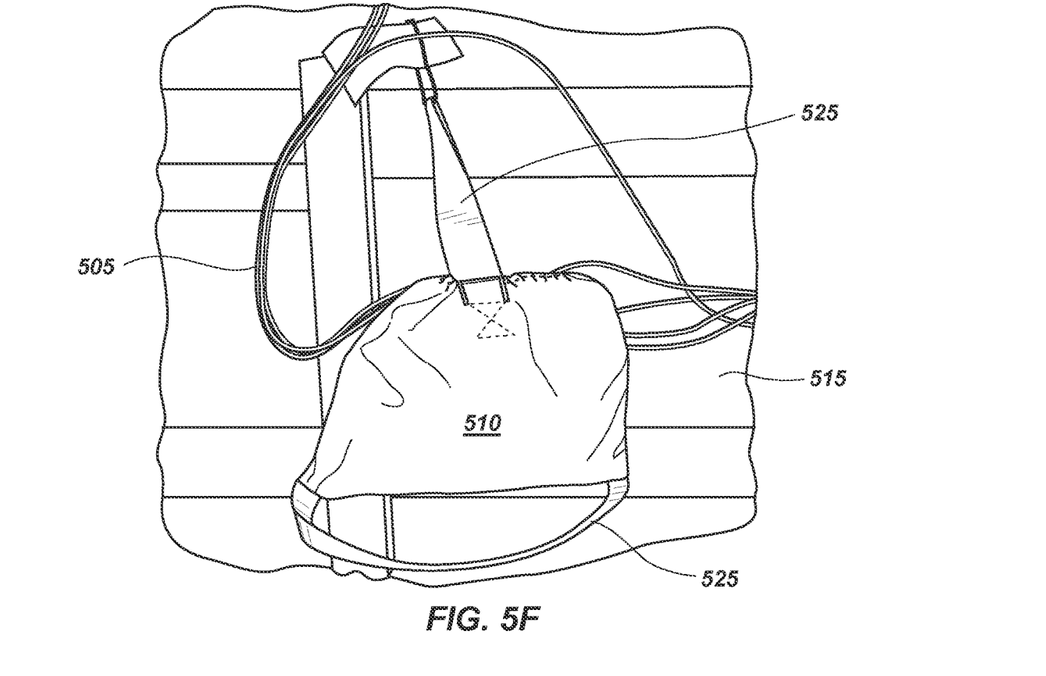
Figure 5G:
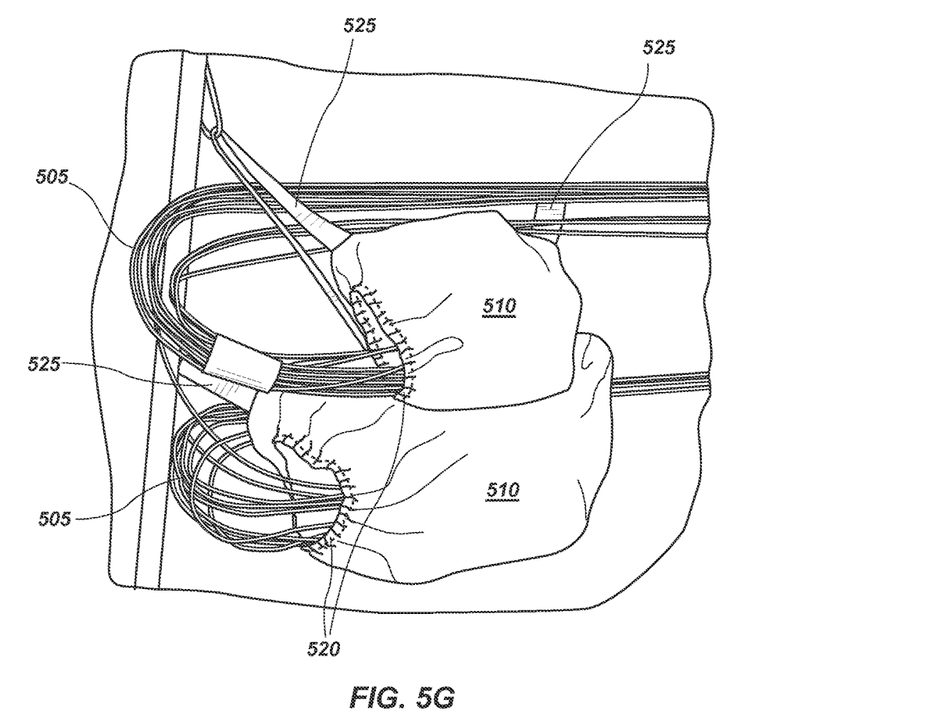

In one example, and as illustrated in FIGS. 5E-5G, wire bundle protector 510 may be configured to retain a wire bundle 505 running along a sidewall of an interior 515 of an unassembled aircraft segment 500 and attach to a structure therein. For instance, wire bundle protector 510 may attach to a portion of an airframe. In one arrangement, wire bundle protector 510 may be reinforced in cases where the wire bundle 505 comprises a heavier-than-ordinary load. Either alone or in combination, the outer surface 530 and the tie 525 may be reinforced with thicker materials and/or stronger seams and points of connection.

Figure 6:
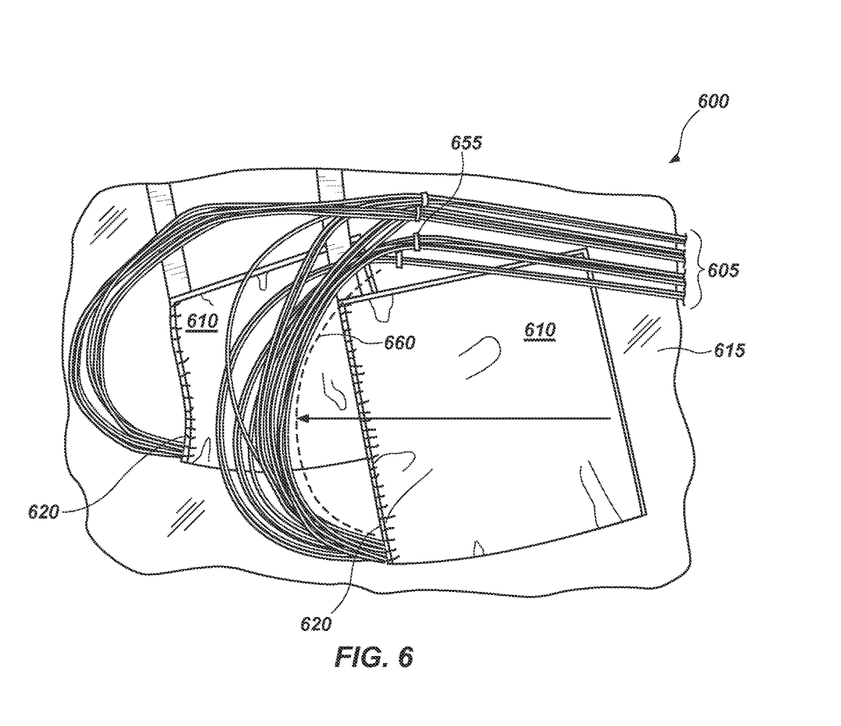
FIG. 6 illustrates a use of wire bundle protectors.

FIG. 6 illustrates an interior 615 of an unassembled aircraft segment 600 comprising a plurality of wire bundles 605 comprising at least one end stored in a plurality of wire bundle protectors 610. The plurality of wire bundles 605 may be secured to a portion of the interior 615 of unassembled aircraft segment 600 with a plurality of fasteners 655. Fasteners 655 may comprise any number of suitable fasteners including zip ties, clamps, straps, and hooks, among other things. The plurality of wire bundles 605 and wire bundle protectors 610 may be configured in order to provide a preferred bend radius (represented by broken line 660). In one example, the preferred bend radius 660 may be a function of the composition of wire bundles 605 and/or a predetermined load value of fastener 655. Of course, other factors may play a role in the configuration of wire bundle protector 610.

For instance, fastener 655 may have a maximum load that is related the material of wire bundle 605, whether wire bundle 605 comprises a connector 345, and if so, the type and weight of connector 345. In one example, fastener 655 may have a maximum load equal to the collective weight of one foot of wire bundle 605 and its connector 345. In another example, fastener 655 may have a maximum load of the weight of less than one foot of wire bundle 605 and its connector 345. In yet another example, fastener 655 may have a maximum load of the weight of more than one foot of wire bundle 605 and its connector 345.

Figure 7:
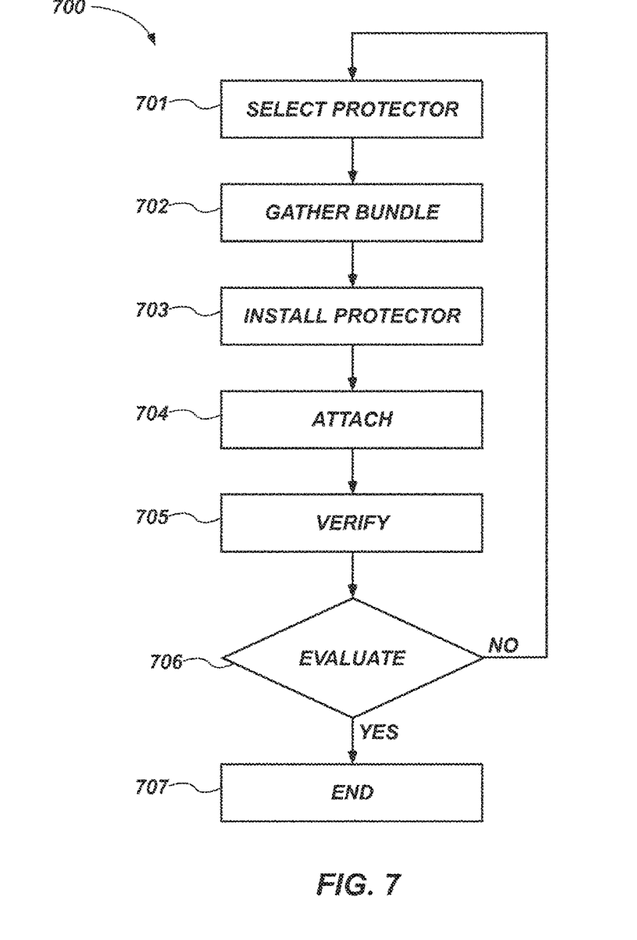
FIG. 7 is a flow diagram illustrating a use of wire bundle protectors according to one example.

FIG. 7 illustrates one method 700 of installing a wire bundle protector 610 according to the present disclosure and from the perspective of a mechanic, or any other person fabricating or otherwise preparing an unassembled aircraft segment 600 for transport or delivery. In a first method step 701, a suitable wire bundle protector 610 is selected. Any number of factors may be considered in selecting a suitable wire bundle protector 610, including, for instance, the load, the placement of wire bundle 605 within unassembled aircraft segment 600, and whether wire bundle protector 610 will cover a free end or a connector of wire bundle 605.

In a second method step 702, wire bundle 605 is gathered or otherwise secured. In a third method step 703, wire bundle protector 610 is installed on wire bundle 605. For instance, in one installation example, self-securing opening 620 may be expanded and wire bundle 605 may be inserted into the self-securing opening 620 of wire bundle protector 610. In a fourth method step 704, wire bundle protector 610 is attached to a portion of an interior 615 of unassembled aircraft segment 600. In a fifth method step 705, wire bundle protector 610 and wire bundle 605 are verified to ensure that they are arranged optimally. For instance, it may be necessary to verify a load on a fastener 655, a bend radius 660, an arrangement of self-securing opening 620, and a comparison of a water line plane 665 with a wire harness plane 670, among other things. It may also be necessary to inspect wire bundle protector 610 to ensure that it is free of damage such as tears, rips, and holes, among other things. In a next step 706, the mechanic determines whether there are other wire bundles 605 upon which to install wire bundle protectors 610. If it is determined that the installation task is complete, then the mechanic may terminate the method. Otherwise, the mechanic will return to the first step 701.

Removal of wire bundle protectors 610 may be summarized as the reverse of method 700 comprising undoing tie 525 of wire bundle protectors 610 and removing wire bundle protectors 610 from wire bundles 605. Additionally, and as has been discussed above, wire bundle protectors 610 may be reused.

Although many of the examples presented in the present disclosure refer to wire bundles in the context of an aircraft, these examples are merely illustrations of potential uses of wire bundle protector 610. Indeed, the present disclosure contemplates using wire bundle protectors 610 in a variety of additional contexts. For instance, in the production of vehicles where parts may be prepared for assembly, and wire installed, and then the parts arranged into a completed vehicle. A vehicle could be any vehicle in which wiring may be installed, such as a car, a bus, a helicopter, a boat, a submarine, and a rocket, among other things. In another example, a prefabricated building may comprise a plurality of walls and other unassembled segments comprising wiring, and wire bundle protector 610 may be used in order to protect the wiring within the prefabricated building. Of course, as will be appreciated by one of ordinary skill in the art, the present disclosure contemplates many additional possible uses of the wire bundle protector 610.

Figure 8A:
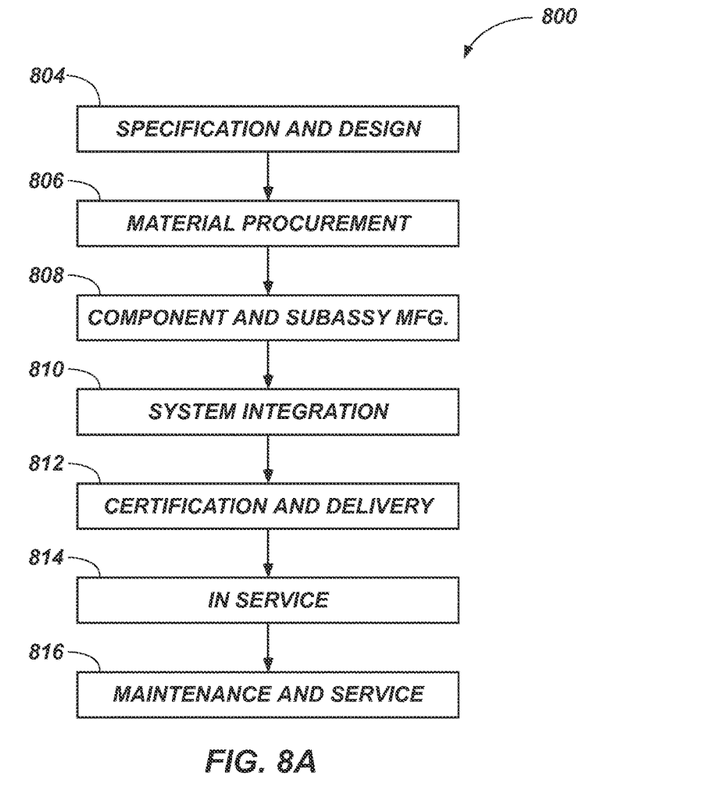
FIGS. 8A and 8B illustrate an example aircraft manufacturing and service method and apparatus.
Figure 8B:
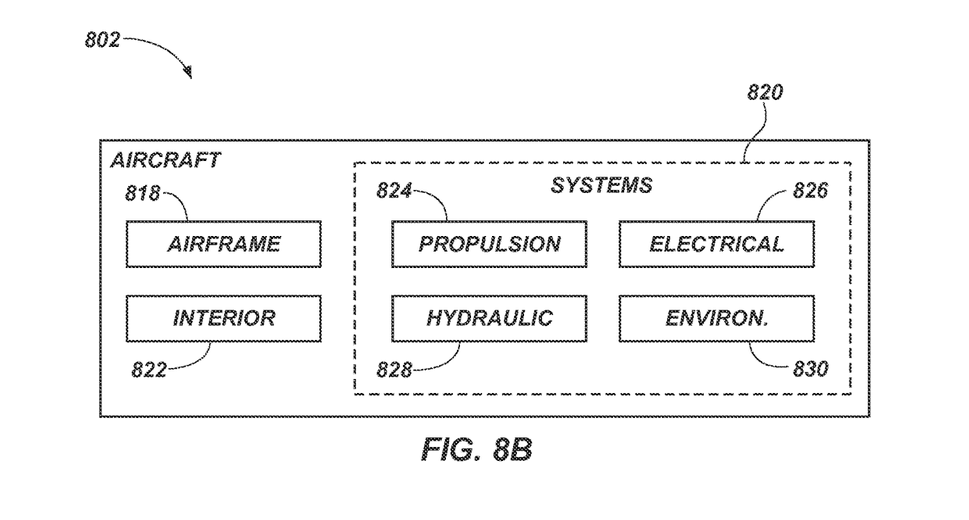

Referring to FIGS. 8A and 8B, examples of the disclosure may be described in the context of an aircraft manufacturing and service method 800 as shown in FIG. 8A and an aircraft 802 as shown in FIG. 8B. During pre-production, exemplary method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service 814 by a customer, the aircraft 802 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8B, the aircraft 802 produced by exemplary method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the disclosed examples may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the aircraft 802 is in service 814. Also, one or more apparatus examples, method examples, or a combination thereof may be utilized during the production stages 808 and 810, for example, by substantially expediting assembly of or reducing the cost of an aircraft 802. Similarly, one or more of apparatus examples, method examples, or a combination thereof may be utilized while the aircraft 802 is in service 814, for example and without limitation, to maintenance and service 816.

Although this disclosure has been described in terms of certain preferred examples, other examples that are apparent to those of ordinary skill in the art, including examples that do not provide all of the features and advantages set forth herein, are also within the scope of this disclosure. Accordingly, the scope of the present disclosure is defined only by reference to the appended claims and equivalents thereof.

What is claimed is:

1. An apparatus comprising:
   an unassembled aircraft segment;
   a plurality of wire bundles secured to the unassembled aircraft segment, each of the plurality of wire bundles comprising at least one of (a) a free end, and (b) a connector;
   a plurality of wire bundle protectors each comprising a fire retardant material, an outer surface, an inner surface configured to define an interior portion, a self-securing opening configured to provide access to the interior portion, and at least one tie connected to the outer surface and configured to secure each of the plurality of wire bundle protectors to a structure of the unassembled aircraft segment that is external to the wire bundle protector, wherein the self-securing opening is configured to secure the wire bundle protector to the wire bundle apart from the at least one tie; and
   wherein each of the plurality of wire bundle protectors is installed on each free end and each connector of the plurality of wire bundles.

2. The apparatus of claim 1 further wherein each of the plurality of wire bundle protectors installed on each connector of the plurality of wire bundles comprises a fire retardant bubble wrap material.

3. The apparatus of claim 1 wherein the at least one tie comprises a different material than the plurality of wire bundle protectors.

4. The apparatus of claim 1 wherein the plurality of wire bundle protectors comprises an anti-static material.

5. The apparatus of claim 1 wherein the unassembled aircraft segment is a fuselage segment.

6. The apparatus claim 1 further wherein the unassembled aircraft segment comprises at least a portion of an airframe and the at least one tie is connected to the portion of the airframe.

7. The apparatus of claim 6 wherein the at least one tie is connected to the portion of the airframe by a zip tie.

8. The apparatus of claim 1 further comprising a plurality of fasteners, each of the plurality of fasteners configured to secure each of the plurality of wire bundles to the unassembled aircraft segment.

9. The apparatus of claim 8 wherein:
   each of the plurality of fasteners has a maximum load value and a minimum bend radius value; and
   the plurality of wire bundle protectors are installed on the plurality of wire bundles such that the maximum load value is not exceeded, and a minimum bend radius of the plurality of wire bundles is equal to or greater than the minimum bend radius value of each of the plurality of fasteners.

10. The apparatus of claim 1 wherein the plurality of wire bundle protectors are configured such that a portion of the self-securing opening is lower than the free end or connector arranged in the interior portion of the plurality of wire bundle protectors.

11. The apparatus of claim 1 wherein the self-securing opening comprises an elastic element.

12. A protector comprising:
    a fire retardant material;
    an outer surface connected to at least one tie securing the outer surface to a structure of an aircraft segment that is external to the protector;
    an inner surface configured to provide an interior of the protector; and
    a self-securing opening configured to provide access to the interior of the protector, the self-securing opening is configured to secure a wire bundle to the protector apart from the at least one tie.

13. The protector of claim 12 wherein the at least one tie is connected to the outer surface via a heat sealing process.

14. The protector of claim 12 further wherein the fire retardant material is also an anti-static material.

15. The protector of claim 12 further wherein:
    the fire retardant material is an anti-static fire retardant polyethylene; and
    the self-securing opening comprises a fire retardant elastic element having fibers with fire retardant properties, and wherein the fire retardant elastic element is attached to the fire retardant material with a fire retardant thread.

16. The protector of claim 12 wherein the at least one tie comprises a different material than the outer surface.

17. An apparatus comprising:
    a plurality of wire bundles, each of the plurality of wire bundles comprising at least one of a free end and a connector;
    a plurality of wire bundle protectors each comprising:
    a fire retardant material;
    an outer surface;
    an inner surface configured to define an interior portion;
    a self-securing opening configured to provide access to the interior portion;
    a first tie connected to the outer surface at a first end of the outer surface; and
    a second tie connected to the outer surface at a second end of the outer surface,
    wherein the first tie and the second tie are configured to secure each of the plurality of wire bundle protectors to a structure of an unassembled aircraft segment external to the wire bundle protector, wherein the self-securing opening is configured to secure the wire bundle protector to the wire bundle apart from the first and second ties, and wherein each of the plurality of wire bundle protectors is installed on each free end and each connector of the plurality of wire bundles.

18. The apparatus of claim 17 further wherein each of the plurality of wire bundle protectors installed on each connector of the plurality of wire bundles comprises a fire retardant bubble wrap material.

19. The apparatus of claim 17 wherein the plurality of wire bundle protectors comprises an anti-static material.

20. The apparatus of claim 17, further comprising an airframe wherein the unassembled aircraft segment is a fuselage segment of the airframe.

* * * * *